Apr. 24, 1923.  
G. C. BOLLER ET AL  
1,452,866  
FRUIT PRESS CRATE AND CLEAT POSITIONING MACHINE  
Filed Jan. 18, 1921  
2 Sheets-Sheet 1

Inventor  
G. C. Boller  
and W. Boller  
By D. Swift  
Attorney

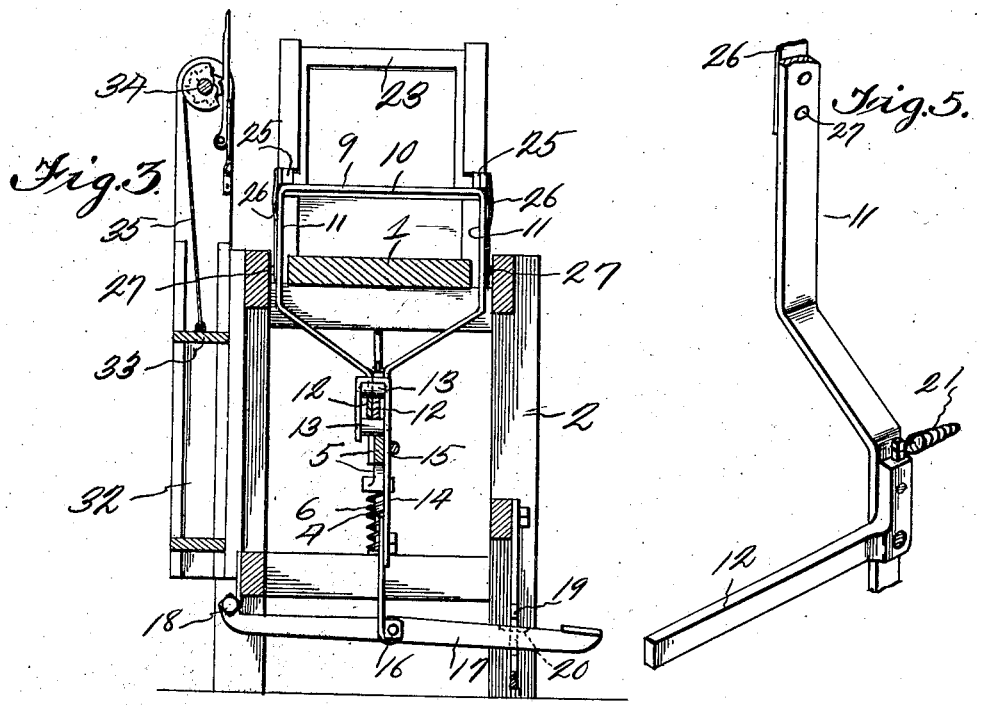
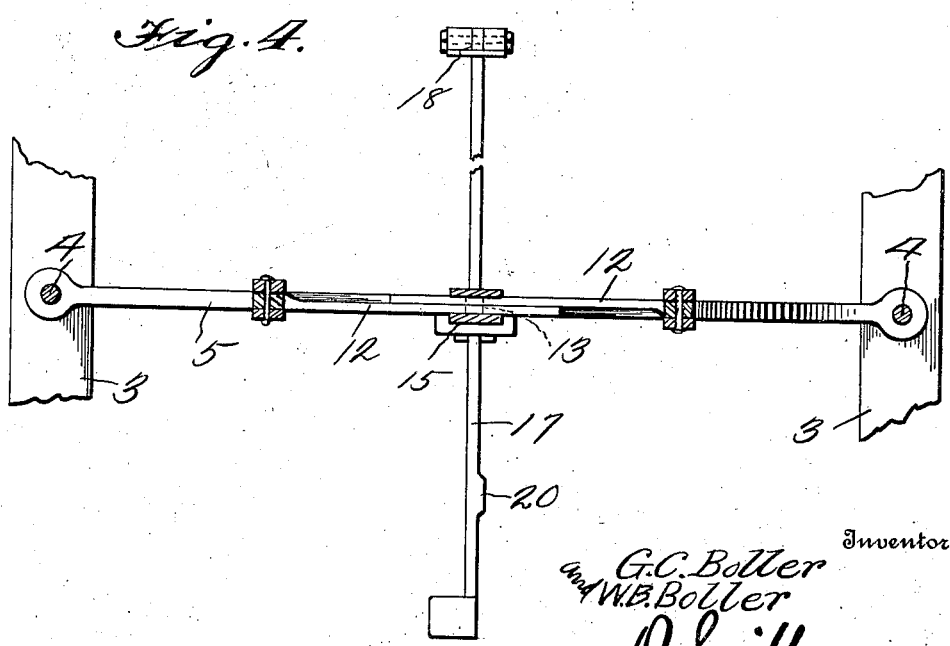

Patented Apr. 24, 1923.

1,452,866

UNITED STATES PATENT OFFICE.

GEORGE CARL BOLLER AND WARREN BIGFORD BOLLER, OF LOOMIS, CALIFORNIA.

FRUIT-PRESS CRATE AND CLEAT-POSITIONING MACHINE.

Application filed January 18, 1921. Serial No. 438,234.

*To all whom it may concern:*

Be it known that we, GEORGE CARL BOLLER and WARREN BIGFORD BOLLER, citizens of the United States, residing at Loomis, in the county of Placer, State of California, have invented a new and useful Fruit-Press Crate and Cleat-Positioning Machine; and we do hereby declare the following to be a full, clear, and exact description of the invention, such as will enable others skilled in the art to which it appertains to make and use the same.

The invention relates to fruit crate presses and has for its object to provide a device of this character wherein covers may be quickly pressed on a fruit crate and cleats removed from cleat magazines located adjacent the ends of the fruit crate and positioned on the fruit crate cover so that they may be easily nailed in place by the operator. Also to provide foot lever means for pressing the cover on the crate and positioning the cleats, thereby allowing the operator to utilize his hands for nailing the cleats in position.

A further object is to provide a fruit crate press and cleat positioning machine comprising a bed on which the crate is positioned, and to provide upwardly extending magazines having a plurality of cleats therein, said magazines being located adjacent the ends of the crate bed. Also to provide foot actuated yokes which move upwardly and outwardly, grasp a cleat from each magazine, moving said cleats inwardly and downwardly simultaneously pressing the cover on the cleat and positioning the cleats in proper position on the crate where they can be easily nailed in place by the operator.

A further object is to provide a vertically movable crosshead normally forced upwardly by springs, said crosshead having pivotally connected thereto the upwardly and outwardly movable yokes which yokes have connected thereto springs of less power than the cross-head springs and to provide the crosshead with a vertically slidable bar pivoted to a foot lever, said yokes being provided with arms guidable in bearings of the vertical slidable bar, the vertical movement of the yoke being accomplished by the initial upward movement of the crosshead and the outward movement of said yoke being accomplished after the crosshead reaches its top limit under the impulse of its springs, said weaker springs will force said yoke outwardly for a cleat grasping operation.

A further object is to provide the yokes with spring actuated cleat grasping members which frictionally engage the ends of the cleats within the magazines and hold the same when the yokes are being moved to pressing position on the fruit crate cover.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 3 is a transverse sectional view taken on line 3—3 of Figure 1.

Figure 4 is a horizontal sectional view taken on line 4—4 of Figure 1, parts of the frame eliminated to better show the structure.

Figure 5 is a detail perspective view of a portion of the lower end of one of the yokes, one side of the yoke being eliminated to better illustrate the structure.

Figure 1:
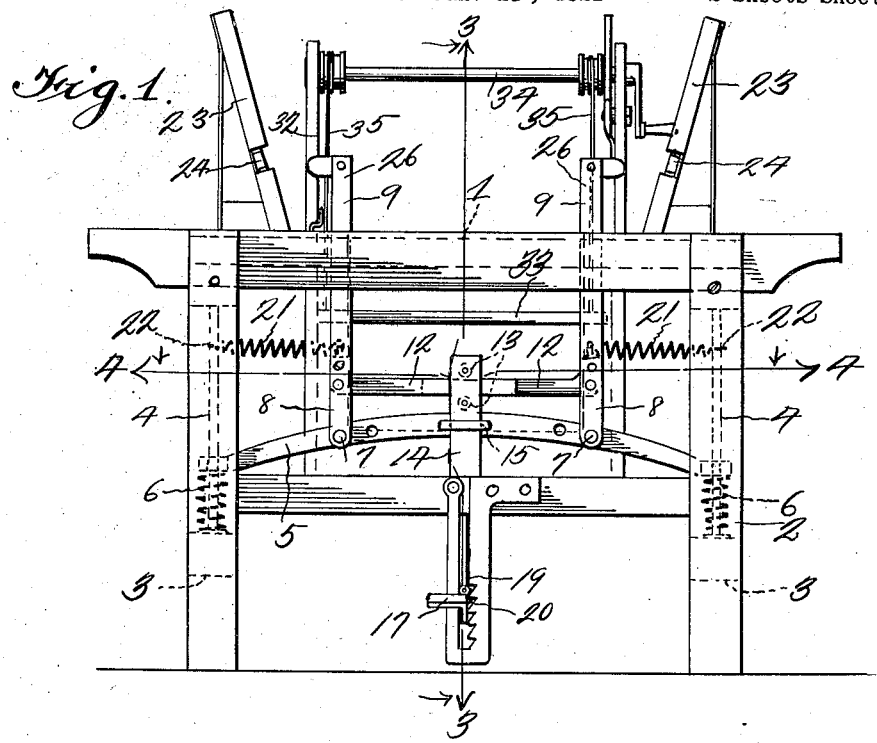
Figure 1 is a front elevation of the machine, showing the foot lever in down position and the yokes in down position.
Figure 2:
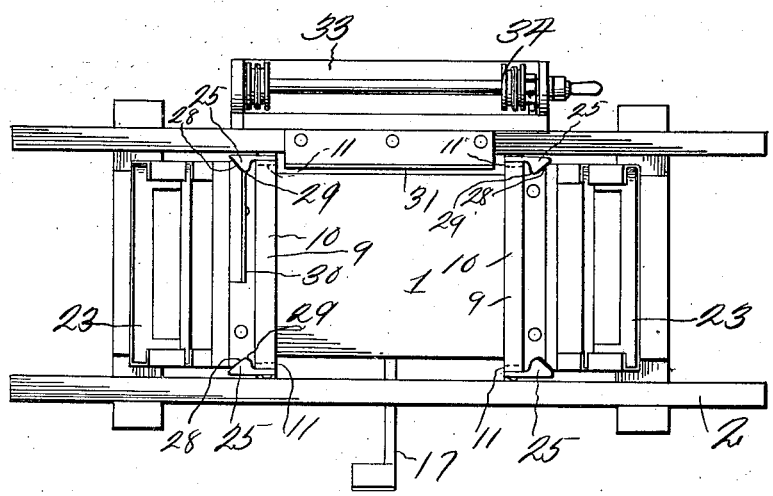
Figure 2 is a top plan view of the machine.

Referring to the drawings, the numeral 1 designates a horizontally disposed bed plate which is supported on a frame 2, said frame 2, being provided with transversely disposed bars 3 at its ends and rising upwardly from said bars at a point centrally thereof are crosshead guides 4 on which guides a vertically movable crosshead 5 is mounted. The crosshead 5 is normally held and forced upwardly at all times by means of coiled springs 6 interposed between the ends of the crosshead 5 and the upper faces of the bars 3. Pivotally connected to the crosshead 5 as at 7 are the upwardly extending arms 8 of the crate pressing yokes 9. The yokes 9 comprise the horizontal bars 10 and the side bars 11, which side bars merge into the arms 8, and are located on each side of the bed plate 1. Secured to the arms 8 are horizontally disposed arms 12, which arms are slidably mounted between rollers 13 of a vertically movable bar 14. The bar 14 is slidably mounted in a bearing 15 of the crosshead 5 and has its lower end pivotally connected as at 16 to a foot lever 17. Foot lever 17 is pivoted as at 18 to the frame 2 and has its forward end disposed adjacent a toothed bar 19 with which toothed bar the flange 20 of the foot lever 17 cooperates when it is desired to hold said lever 17 in various positions against the action of the coiled springs 6. Connected to the arms 8 at a point above the horizontally disposed arms 12 are coiled springs 21, the outer ends of said coiled springs are preferably secured at 22 to the crosshead guides 4. Springs 21 are preferably weaker than the springs 6.

When the yokes 9 are in down position as shown in Figure 1, and it is desired to move said yokes upwardly for clearing the ends of a crate which is on the bed plate 1, the operator puts his foot on the lever 17, disengaging said lever from the toothed bar 19, then allows the crosshead 5 and the yokes to be moved upwardly under the impulse of the coiled springs 6. After the expansive force of the coiled springs 6 is relieved from the lower side of the cross head 5, the yokes will have been moved vertically a sufficient distance to clear the ends of the crate. On a further upward movement of the lever 17, the vertically slidable bar 14 will slide in the bearing 15, being forced outwardly by the upward movement of the arms 12 under the impulse of the coiled springs 21, which move the yokes as a whole outwardly on their pivotal point 7, the purpose of which will presently appear. Rising upwardly from the ends of the bed plate 1 are upwardly and outwardly inclined frames 23 in which frames a plurality of cleats 24 is disposed, said cleats being adapted to be simultaneously removed from the frame 23 by spring actuated gripping jaws 25 carried by the yokes 10, the springs 26 of which jaws are secured as at 27 to the sides 11 of the yokes 10 so that sufficient spring action will be allowed to the gripping jaws 25 when their inclined surfaces 28 engage the ends of the cleats, and are forced outwardly to a position where the noses 29 of the gripping jaws 25 engage the ends of the cleat. After the cleats have been grasped between the gripping jaws 25, the foot lever 17 is forced downwardly, which action will cause the arms 12 to be forced downwardly by the vertically slidable bar 14 stretching the weaker springs 21 and after the arms 12 reach a horizontal position, which position positions the yokes 10 vertically, the lower roller 13 engages the upper edge of the crosshead 5. The action up to this time has caused a removal of cleats from each frame 23 and the moving inwardly of the yokes 10 until they arch the ends of the crate and cover. On a further downward movement of the foot lever 17, the bar 7 will force the crosshead 5 downwardly, thereby compressing the coiled springs 6 and forcing the transverse portions 10 of the yokes 9 downwardly into engagement with the ends of the cover of the fruit crate for securely packing said crate and pressing the cover in position and holding the cover in compressed position. It is the present practice to nail cleats adjacent the ends of the cover for additionally securing the same to the crate and bracing the cover. The gripping jaws 25 are therefore so positioned that when the lever is in down position the cleats will be properly positioned on the cover and all that the operator will have to do is to nail the cleats into position. The above operation is continued for securing the cover of each crate.

The bed plate 1 adjacent one of its ends is provided with an upstanding flange 30 and the frame 1 adjacent the back of the bed plate 1 is provided with an upstanding flange 31. Flanges 30 and 31 are adapted to be received or engaged by the sides of the crate so that the crate may be properly positioned on the bed plate in a position where the yokes will easily pass over the ends of the crate.

Vertically slidable in guides 32 carried by the rear side of the frame 1 is a vertically movable platform 33 on which platform a plurality of crates may be disposed and raised as desired through the medium of the windlass 34, which has cable connections 35 with the platform 33, however, this mechanism may be eliminated if desired.

From the above it will be seen that a combined fruit crate press and cleat positioner is provided, the operation of which is entirely controlled by a foot lever, thereby allowing the operator's hands to be utilized entirely for nailing the cleats in position on the crate cover adjacent its ends.

The invention having been set forth what is claimed as new and useful is:—

1. A fruit crate cover press and cleat positioner, said press comprising a bed plate supported on a frame, and adapted to have placed thereon a fruit crate having a cover, cleat magazines adjacent the ends of the bed plate, and means whereby cleats will be simultaneously removed from the magazines moved inwardly and downwardly to positions adjacent the ends of the cover of the crate and the cover pressed downwardly on the crate at its ends.

2. A fruit crate cover press and cleat positioner, said press and positioner comprising a frame supported bed plate for the reception of a fruit crate having a cover thereon, yokes arching the ends of the bed plate, cleat magazines adjacent the ends of the bed plate, cleat gripping members carried by the yokes and lever means whereby said yokes may be simultaneously moved upwardly and outwardly to grasp cleats from the cleat magazines, then moved inwardly for arching the ends of the crate and downwardly for compressing the cover of the plate and positioning the cleats on the cover.

3. A fruit crate cover press and cleat positioner, said press and cleat positioner comprising a frame supported bed plate for the reception of a fruit crate having a cover thereon, magazines for the reception of cleats disposed adjacent the ends of the bed plate, U-shaped yokes arching the ends of the bed plate and provided with horizontal portions, a vertically movable cross head, the lower ends of said yokes being pivotally connected to the vertically movable crosshead, inwardly extending rigid arms carried by the yokes adjacent the crosshead and having their arms disposed in a bearing of a vertically movable and guided bar, foot lever means connected to the lower end of said vertically movable bar for forcing the same downwardly, spring means for normally forcing the crosshead upwardly, spring means for normally holding the yoke members outwardly and lever and spring means whereby upon an upward movement of the foot lever from its lower position, said yokes will be moved in a vertical plane for the first part of the upward movement and outwardly at their outer ends during the remainder of the upward movement of the yoke and the cleat gripping member carried by the yoke positioned for removing cleats from the magazines thereby allowing the cleats to be positioned on the cover on the downward movement of the foot lever.

4. A fruit crate cover press and cleat positioner, comprising a frame supported bed plate for the reception of a crate having a cover, of lever controlled yokes inwardly and downwardly movable, magazines located adjacent the ends of the bed plate, gripping members carried by the yokes and positioned where they will grip and remove cleats from the magazine, carry them inwardly and downwardly and position them on the cover during a compression of the cover by the yokes.

In testimony whereof we have signed our names to this specification in the presence of two subscribing witnesses.

GEORGE CARL BOLLER.
WARREN BIGFORD BOLLER.

Witnesses:
E. D. DUNTON,
J. J. CALLESON.